April 23, 1963 G. H. PERRY ETAL 3,087,070

ELECTRONIC STORAGE AND SWITCHING ARRANGEMENTS

Filed March 15, 1957 3 Sheets-Sheet 1

Inventors
Gerald H. Perry
Eric W. Schallow
By: Stevens, Davis, Miller & Mosher
Attorneys Inventors
Gerald H. Perry
Eric W. Shallcross
By: Stevens, Davis, Miller & Mosher
Attorneys

ELECTRONIC STORAGE AND SWITCHING ARRANGEMENTS

Inventors
Gerald Horace Perry
Eric William Shallow
By: Stevens, Davis, Miller & Mosher, Attorneys United States Patent Office 3,087,070

Patented Apr. 23, 1963

3,087,070

ELECTRONIC STORAGE AND SWITCHING ARRANGEMENTS

Gerald Horace Perry and Eric William Shallow, Malvern, England, assignors to National Research Development Corporation, London, England, a British corporation Filed Mar. 15, 1957, Ser. No. 646,344
Claims priority, application Great Britain Mar. 21, 1956
14 Claims. (Cl. 307—88)

This invention relates to electronic storage and switching arrangements and has reference to those arrangements known as binary counters.

A binary counter is a circuit which, for every two successive input stimuli it receives, gives a single output signal. Such counters are often based on the use of a so-called two-state permanent memory; that is a two-state circuit element which can be driven into one or other of its two states by appropriate input signals and, in the absence of further input signals, remain in that state indefinitely. Investigations on a large number of different binary counters have shown that, notwithstanding the use of this convenient circuit element, a certain amount of duplication of circuit elements takes place. This duplication generally entails a penalty; for instance cost, reliability and power consumption can be adversely affected.

It is an object of the present invention therefore to provide an improved binary counter in which some economy of circuit elements is obtained.

According to the invention a binary counter is provided comprising a permanent memory having first and second stable states and two inputs, arranged so that a signal at its first imput can change the memory from the first to the second state, such a signal effecting no change when the memory is in its second state, and a signal at its second input can change the memory from the second state to the first even in the presence of a signal as aforesaid at the first input, an input circuit adapted in response to an input stimulus to feed to the first and second inputs of the permanent memory signals for changing its state, the arrangement being such that the feeding of a signal to the second input is inhibited whenever the input circuit feeds a signal to the first input with the memory in its first state, and an output circuit adapted to give an output signal for each change of state of the permanent memory occurring in a predetermined sense, whereby for two successive stimuli applied to the input circuit one output signal is obtained from the output circuit.

Also according to the invention a binary counter comprises in combination a permanent memory having first and second stable states and two inputs, arranged so that a signal at its first input can change the memory from the first to the second state, such a signal effecting no change when the memory is in its second state, and a signal at its second input can change the memory from the second state to the first even in the presence of a signal as aforesaid at the first input, an input circuit for feeding, in response to an input stimulus, input signals to the first and second inputs of the permanent memory, the input circuit having a gate for gating the input signal to the second input of the permanent memory, a temporary memory activated whenever the input circuit feeds a signal to the first input with the permanent memory in its first state, the gate being controlled by the temporary memory to inhibit the feeding of an input signal to the second input of the permanent memory whenever the temporary memory is activated, and an output circuit for giving an output signal in response to each change of state of the permanent memory occurring in a predetermined sense.

Further according to the invention there is provided a binary counter comprising a magnetic core of the rectangular hysteresis loop type having first and second energising coils, an input circuit for responding to an input stimulus applied thereto to feed a signal to each of the two coils, each signal energising the core into a different magnetic state and the arrangement being such that the second coil establishes a first magnetic state even when the core is energised by the first coil, a gate in the input circuit for controlling the feeding of a signal to the second coil, means for inhibiting the gate to prevent the feeding of a signal to the second coil whenever a signal is fed to the first coil with the core in a state due to energisation by the second coil, and an output circuit adapted to give an output signal for each change of state of the permanent memory occurring in a predetermined sense.

In order to make the invention clearer the basic principles of a binary counter according to the invention will now be discussed and examples of typical binary counters will be described, reference being made to the accompanying drawings, in which.

Figure 1:
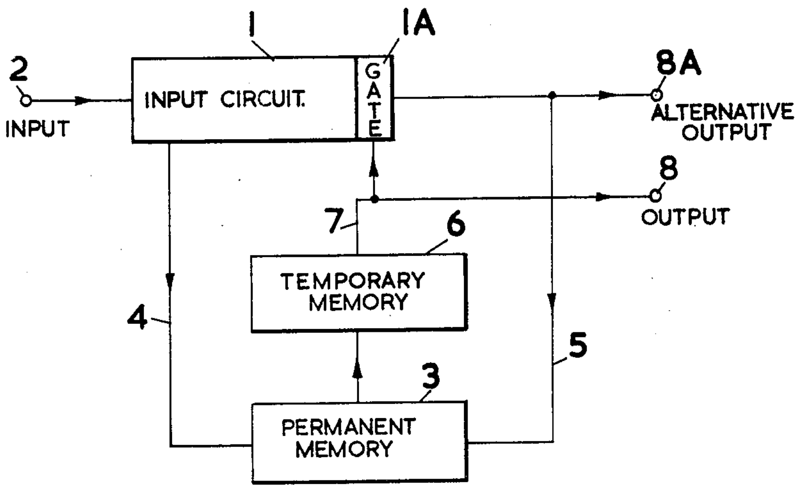
FIG. 1 shows schematically the general arrangement of a binary counter.

In FIG. 1 an input circuit 1 is fed with input stimuli from an input point 2 and controls the routing of signals to a permanent memory 3 via paths 4 and 5. The permanent memory 3 is a two-state memory which can be driven into either of its two states and can remain in a given state indefinitely. To describe the two states of this memory it is convenient to use the binary notation and designate them the '0' and the '1' state.

The permanent memory 3 is arranged so that an input signal of a given sense applied along the path 4 will change the memory from one state to the other, say, from '0' to '1'; also an input signal of a predetermined sense applied along the path 5 changes the memory from the '1' to the '0' state irrespective of whether an input signal is being applied along the other path 4.

A temporary memory 6 is associated with the permanent memory 3 and provides a transitory signal over a path 7 which begins when the memory 3 commences to change over from the '0' to the '1' state and lasts for as long as an input signal is present which could be routed along the path 5.

The path 7 feeds the transistory signal to operate a gate 1A included in the input circuit 1. The gate 1A closes the path 5 and can be opened to route an input signal for the memory 3 along the path 5. Thus the gate 1A opens only when the memory 3 changes its state in a predetermined direction, i.e., from the '0' to the '1' state.

An output 8 is conveniently taken from the path 7; an alternative output 8A is available from the path 5.

In operation, an input stimulus is applied to the input point 2; the input circuit 1 responds to feed an input signal for the memory 3 along the path 4. If it is assumed that the permanent memory 3 commences in the '1' state then the signal along the path 4 does not cause the permanent memory 3 to change its state. In response to the same stimulus an input signal for the memory 3 passes through the gate 1A along the path 5; the permanent memory thereupon changes from the '1' to the '0' state; the temporary memory 6 has not acted to inhibit operation of the gate 1A and so keep the path 5 closed because the permanent memory 3 has not changed over in the required sense.

The permanent memory 3 is now in the '0' state; when the next stimulus is applied at the point 2 the input circuit 1 applies along the path 4, a signal to the memory 3 which commences to change from the '0' to the '1' state. As soon as this change commences the temporary memory 6 is activated and thereafter inhibits operation of the gate 1A with the result that no input signal for the memory 3 passes along the path 5. The temporary memory 6 maintains this inhibition for as long as there is any possibility of an input signal for the memory 3 passing along the path 5. The permanent memory 3 is now again in the original '1' state and the counter has returned to its original condition. A complete counting cycle has taken place in which two input stimuli have been applied at the point 2 and at the output 8, or the alternative output 8A, only one corresponding output signal will have occurred. It will be appreciated the input stimulus can consist of single signals from which the input circuit 1 can derive suitable input signals in parallel for the inputs of the permanent memory 3 along paths 4 and 5; provision must then be made in the input circuit 1 to ensure that the signal passed along the path 4 when the permanent memory 3 is in the '0' state sufficiently in advance of any possible signal along the path 5 to allow time for the activation of the temporary memory 6 and the inhibiting of the gate 1A.

Where the preceding circuit from which the input stimulus is derived is suitably arranged it is also possible for the input stimulus itself to consist of signals applied in parallel; for example one signal for application to the path 4 and the other for the path 5 in the gate 1A. In such a case the necessary relative timing of the two signals may be effected in the preceding circuit, or partly in the preceding circuit and partly in the input circuit 1, or, as in the case of the single signal stimulus, in the input circuit 1 itself.

A convenient way of realising the general principles discussed above with reference to FIG. 1, is by the use, together, of transistors and wound magnetic cores of the so-called rectangular hysteresis loop type. By this means not only can some economy in components be achieved but an economy in power consumption becomes apparent; the transistor is itself a low-voltage/low-current device; and a permanent memory which makes use of the two-state properties of a rectangular hysteresis loop magnetic core need only involve consumption of power when changing its state.

Figure 2:
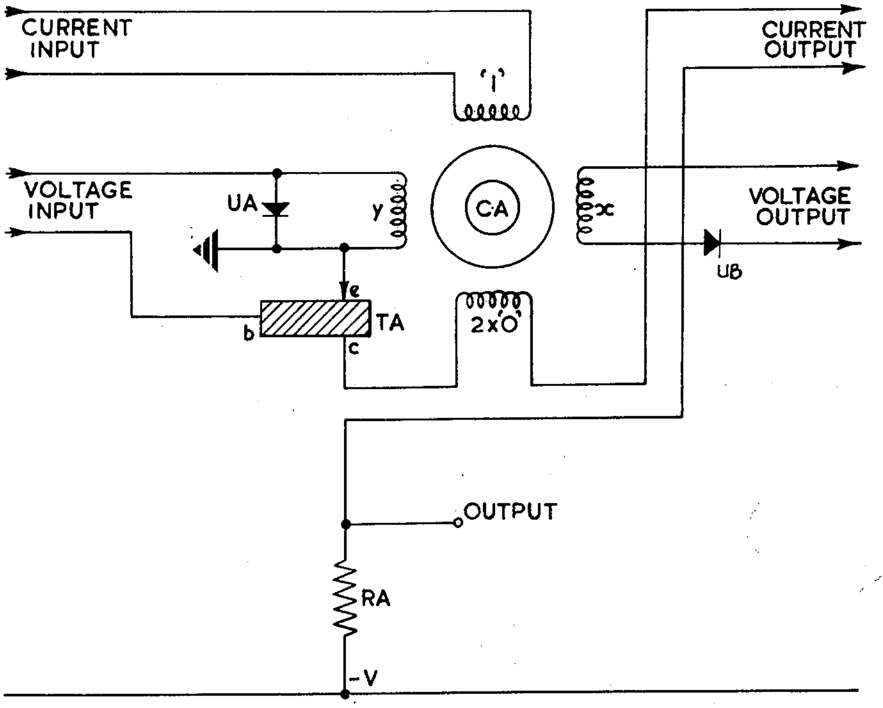
FIG. 2 shows a circuit diagram of a binary counter.

FIG. 2 shows a simple binary counter circuit, using a transistor and a magnetic core, for use alone, or, for connection in a chain of binary counters.

A rectangular hysteresis loop magnetic core CA is wound with four coils '1,' 2×'0,' *x* and *y*. According to a standard convention which has already been adopted in our copending patent application No. 36,294/55 (U.S. Serial No. 629,174), the '1' coil for a given sense of current flow will establish, or alternatively not disturb, a '1' state in the core CA: the 2×'0' coil will establish, or alternatively not disturb, a '0' state in the core CA—the symbols "2×" indicate that, in normal circuit operation, the coil energises the core CA in the '0' state at twice the level at which the '1' coil energises the core CA in the '1' state and so, if the '1' coil and the 2×'0' coil simultaneously energise the core CA in the course of operation of the circuit, the net result will be an energisation of the core CA in the '0' state.

A current input is connected to the '1' coil of the core CA and a voltage input is connected to the *y* coil in series with the base-emitter circuit of an 'N'-type transistor TA; the emitter of the transistor TA is earthed. A rectifier of the junction diode type UA is shunted across the *y* coil.

A voltage output is obtained from the *x* coil of the core CA and a current output is obtained from a negative line −V via a resistor RA, the 2×'0' coil of the core CA and the emitter-collector circuit of the transistor TA.

To consider operation of the counter it is convenient to consider the input stimuli to the circuit of FIG. 2 as being trains of current and voltage pulses at the current and voltage inputs respectively. The current pulses are of a sense appropriate to change over the core CA by means of its '1' coil and the voltage pulses are of a sense appropriate to drive the base of the N-type transistor TA negative relative to its emitter to operate it.

If the core CA is assumed to be in the '0' state, then the pulse in the '1' coil will change the state of the core CA from '0' to '1' and the resulting pulse induced in the *y* coil as the core CA changes opposes the input voltage pulse applied to the voltage input and inhibits operation of the transistor TA. The circuit therefore remains with the core CA in the '1' state. The junction diode UA shunted across the *y* coil serves to lengthen the inhibiting (induced) pulse in that coil so that the input voltage pulse is opposed for the duration of the input stimulus.

The core CA is thus in the '1' state and a second stimulus consists of a current pulse in the '1' coil of the core CA, and a voltage pulse at the voltage input which tends to cause operation of the transistor TA.

The current pulse in the '1' coil naturally connot change the state ('1') of the core CA; the transistor TA does operate however, owing to the pulse at the voltage input. (As there is no change, this time, of the state of the core CA, there is no corresponding induced E.M.F. in the *y* coil and the rectifier UA shunts this coil). When the transistor TA operates, its emitter supplies current to the current output via the 2×'0' coil which thereupon changes the state of the core CA from '1' to '0' in spite of the simultaneous energisation of the '1' coil by the current input. The change of state of the core CA induces a voltage in the *y* coil tending to help the operation of the transistor TA already taking place, thereby giving a measure of regeneration.

The core CA is again in the '0' state and the sequence of events just described can be repeated indefinitely in response to successive pairs of input stimuli.

For each pair of stimuli (a unidirectional pulse in each of the current and voltage inputs) in the input of the circuit an output pulse of a predetermined polarity is produced in each of the current and voltage outputs, corresponding to changeover of the core CA from the '1' to the '0' state. Voltage pulses of opposite polarity also occur in the '*x*' coil of the voltage output but are, in practice, either disregarded or, if their presence cannot be tolerated, filtered out by any convenient known means, for example, a diode UB in series with the voltage output circuit as shown.

A chain of such circuits can be used to obtain high overall counting ratios; the current and voltage inputs are then obtained from the current and voltage outputs of the preceding circuit. It will be appreciated that, as mentioned in the previous paragraph, pulses of both polarities are produced at the voltage output owing to the E.M.F's of alternately opposing polarities which are induced in the coil *x* when the core CA changes its state. The voltage input, of course, only requires the voltage pulses of one polarity which occur with current pulses in the current input.

Because it is the *x* coil of one circuit which is connected to the *y* coil of a succeeding circuit it will be appreciated that, if the cores of a chain of binary counters are identical, the number of turns on a *y* coil should exceed those on an *x* coil to ensure that an adequate voltage pulse is provided for the correct operation of the next circuit; a ratio of 20 turns on a *y* coil to 15 turns on an *x* coil has been used. The rectifier UA ensures that the *y* coil sees a low impedance, when a non-inhibiting pulse is present.

Where a long chain of binary counters is required satisfactory operation will be achieved so long as a certain maximum number of series counters is not exceeded. The existence of such a maximum is due to a tendency for the voltage output pulses to lengthen along the counter chain and the value of the maximum depends upon the individual circuit parameters. For accurate operation it is advisable for the $y$ inhibit pulse length to be slightly greater than the voltage output $x$ pulse of the preceding counter. To enable the maximum to be exceeded safely a modified binary counter can be inserted at intervals along the chain.

Figure 3:
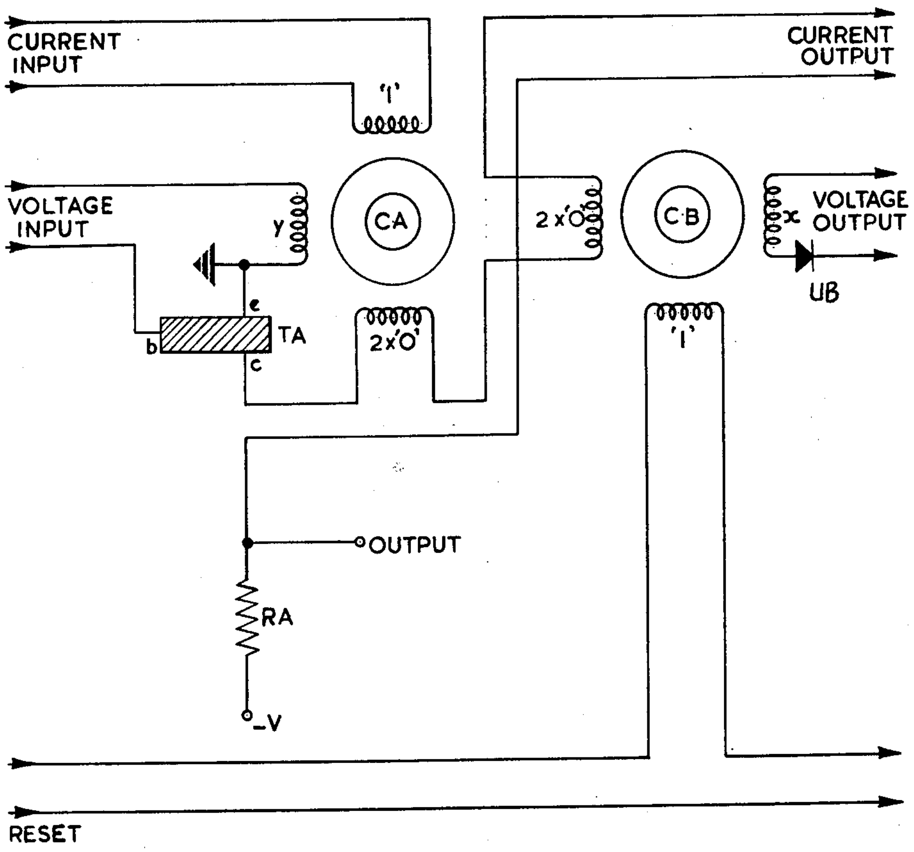
FIG. 3 shows a circuit diagram of a binary counter for use in a long chain of counters of the type shown in FIG. 2, and FIGS. 4 and 5 illustrate the casading of binary counters of FIGS. 2 and 3.
Figure 4:
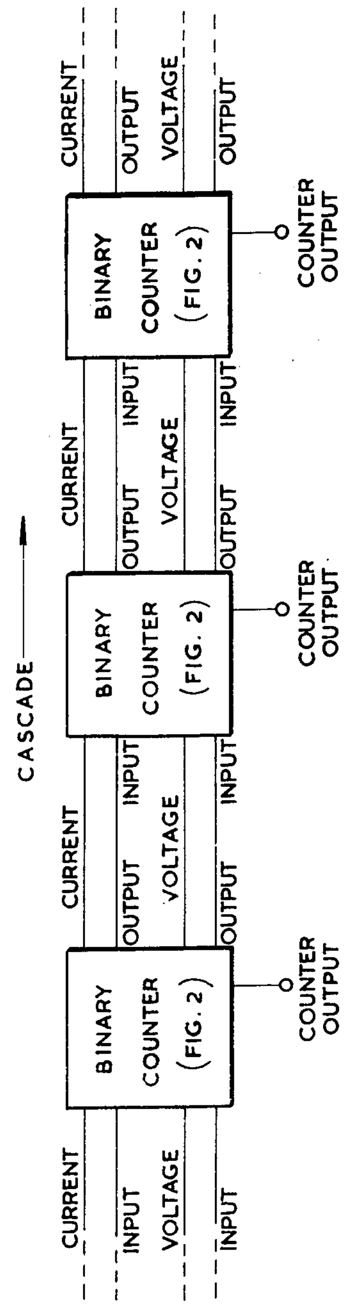
Figure 5:
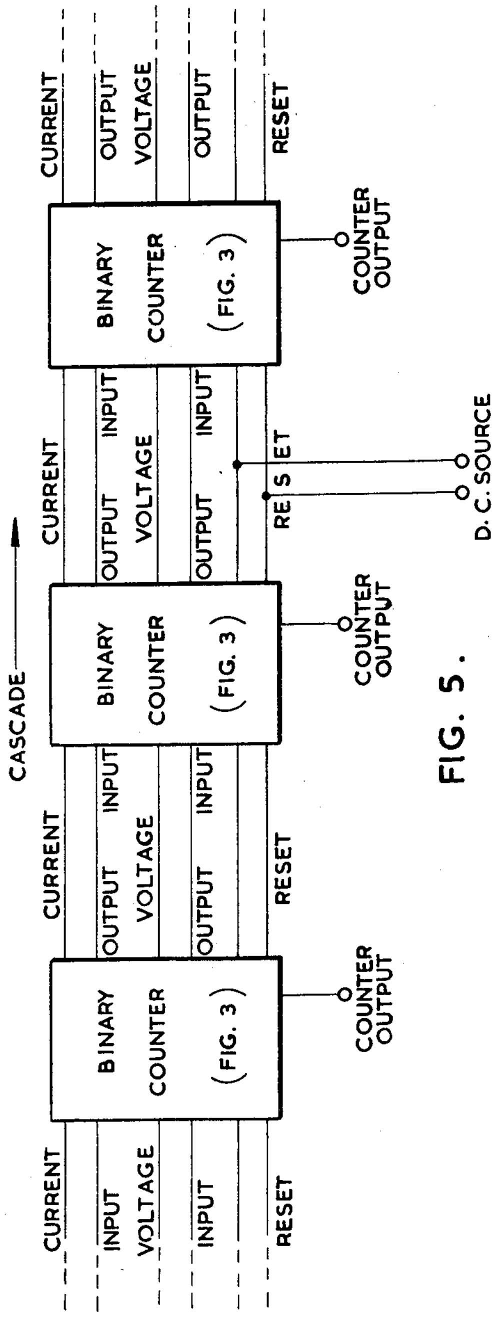

In FIG. 3 the arrangement is similar to that of FIG. 2 except that a second core CB is employed. The $x$ coil is transferred from the core CA to the core CB and the current output via the 2×'0' coil of the core CA is connected in series with a 2×'0' coil on the core CB.

Thus, when the transistor TA is operated to changeover the core CA the current output passing through the 2×'0' coil of the core CB changes its state from '1' to '0'; thus a corresponding voltage output is obtained by virtue of the $x$ coil on the core CB after the changeover of this additional core. The action here is that of ensuring that whatever length of current pulse is presented from a preceding circuit the length of the output voltage pulse is kept reasonably uniform along the chain.

A '1' coil is provided additionally on the core CB for connection to a source of direct current. This ensures that the core CB is automatically reset each time it has been energised by its 2×'0' coil in series with the current output.

What we claim is:

1. A binary counter comprising a magnetic core permanent memory of the rectangular hysteresis loop type having first and second energising coils, an input circuit for responding to an input stimulus applied thereto to feed a signal to each of the two coils, each signal energising the core into a different magnetic state and the arrangement being such that the second coil establishes a first magnetic state even when the core is energised by the first coil in a first sense, a gate included in the input circuit for controlling the feeding of a signal to the second coil, means for inhibiting the gate to prevent the feeding of a signal to the second coil whenever a signal is fed to the first coil with the core in a state due to energisation by the second coil, and an output circuit in series connection with said second energising coil adapted to give an output signal for each change of state of the permanent memory occurring in a predetermined sense.

2. A binary counter as claimed in claim 1, wherein the means for inhibiting the gate comprise a third coil coupled to the magnetic core and adapted to apply an inhibiting signal to the gate whenever the first coil energises the core to change its state.

3. A binary counter as claimed in claim 2, wherein the gate comprises a transistor connected with its base-emitter circuit in series with the third coil so that the signal applied to the gate when an input stimulus is applied to the input circuit is opposed by a signal induced by changeover of the core state when the core is energised by the first coil, the second coil of the core being connected in the collector circuit of the transistor.

4. A binary counter as claimed in claim 3, wherein a junction diode is shunted across the third coil to prolong the signal induced therein.

5. A binary counter, as claimed in claim 1, connected in a cascade chain of binary counters, and an output to a succeeding counter being provided by a fourth coil on the magnetic core.

6. A binary counter as claimed in claim 5, wherein a second magnetic core is provided having a reset winding, an output winding, and an energising winding, said energising winding being connected in series with the second coil-transistor collector circuit and arranged to change the state of the core with the reset winding energising the core in the opposite sense, whereby an output to a succeeding counter is obtained from the fourth coil on the first magnetic core and from the output winding of the second magnetic core, the reset winding being connected in operation to a current source to establish a magnetic state in the second core opposite to that established by its energising winding.

7. A binary counter, as claimed in claim 2, connected in a cascade chain of binary counters, an output to a succeeding counter being provided by a fourth coil on the magnetic core, and a series connection in the circuit comprising the second energising coil and the collector of the transistor.

8. A binary counter as claimed in claim 7, wherein a second magnetic core is provided having a reset winding, an output winding, and an energising winding, said energising winding being connected in series with the second coil-transistor collector circuit and arranged to change the state of the core with the reset winding energising the core in the opposite sense, whereby an output to a succeeding counter is obtained from the fourth coil on the first magnetic core and from the output winding of the second magnetic core, the reset winding being connected in operation to a current source to establish a magnetic state in the second core opposite to that established by its energising winding.

9. A binary counter, as claimed in claim 2, connected in a cascade chain of binary counters, an output to a succeeding counter being provided by a fourth coil on the magnetic core, and a series connection in the circuit comprising the second energising coil and the collector of the transistor.

10. A binary counter as claimed in claim 9, wherein a second magnetic core is provided having a reset winding, an output winding, and an energising winding, said energising winding being connected in series with the second coil-transistor collector circuit and arranged to change the state of the core with the reset winding energising the core in the opposite sense, whereby an output to a succeeding counter is obtained from the fourth coil on the first magnetic core and from the output winding of the second magnetic core, the reset winding being connected in operation to a current source to establish a magnetic state in the second core opposite to that established by its energising winding.

11. A binary counter, as claimed in claim 4, connected in a cascade chain of binary counters, an output to a succeeding counter being provided by a fourth coil on the magnetic core, and a series connection in the circuit comprising the second energising coil and the collector of the transistor.

12. A binary counter as claimed in claim 11, wherein a second magnetic core is provided having a reset winding, an output winding, and an energising winding, said energising winding being connected in series with the second coil-transistor collector circuit and arranged to change the state of the core with the reset winding energising the core in the opposite sense, whereby an output to a succeeding counter is obtained from the fourth coil on the first magnetic core and from the output winding of the second magnetic core, the reset winding being connected in operation to a current source to establish a magnetic state in the second core opposite to that established by its energising winding.

13. A binary counter comprising a permanent memory having first and second stable states and two inputs, said memory and said inputs connected so that a signal at its first input can change the memory from the first to the second state, the first input signal effecting no change when the memory is in its second state, and a signal at its second input for changing the memory from the second state to the first state, the second input including means for changing the memory from the second state to the first state even in the presence of the first input signal applied to the first input, an input circuit having means in response to an input stimulus to feed the signals respectively to the first and second inputs of the permanent memory for changing its state, the input circuit including inhibiting means to inhibit the feeding of the second input signal to the second input whenever the input circuit feeds the first input signal to the first input with the memory in its first state, an output circuit in series with one of the two inputs to give an output signal for each change of state of the permanent memory occurring in a predetermined sense, whereby for two successive stimuli applied to the input circuit, one output signal is obtained from the output circuit.

14. A binary counter comprising in combination a permanent memory having first and second stable states and two inputs, input circuit means for feeding in response to an input stimulus, input signals to the first and second inputs of the permanent memory, said memory and said inputs connected so that the first input signal when applied to its first input can change the memory from the first to the second state, the first input signal effecting no change when the memory is in its second state, and an override signal applied to its second input for changing the memory from the second state to the first state even when the presence of the first input signal is applied to the first input, the input circuit means having a gate for gating the input signal to the second input of the permanent memory, a temporary memory activated whenever the input circuit means feeds a signal to the first input with the permanent memory in its first state, the gate being controlled by the temporary memory to inhibit the feeding of an input signal to the second input of the permanent memory whenever the temporary memory is activated, and an output circuit in series with one of the two inputs for giving an output signal in response to each change of state of the permanent memory occurring in a predetermined sense.

References Cited in the file of this patent

UNITED STATES PATENTS

| | | |
|---|---|---|
| 2,622,212 | Anderson | Dec. 16, 1952 |
| 2,902,609 | Ostroff | Sept. 1, 1959 |
| 2,911,626 | Jones | Nov. 3, 1959 |
| 2,925,958 | Polzin | Feb. 23, 1960 |